(12) United States Patent
Cho et al.

(10) Patent No.: US 11,385,149 B2
(45) Date of Patent: Jul. 12, 2022

(54) ELASTICITY MEASUREMENT DEVICE

(71) Applicant: Korea Advanced Institute of Science and Technology, Daejeon (KR)

(72) Inventors: Young-Ho Cho, Daejeon (KR); Sunghyun Yoon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 353 days.

(21) Appl. No.: 16/633,205

(22) PCT Filed: Jul. 24, 2018

(86) PCT No.: PCT/KR2018/008340
§ 371 (c)(1),
(2) Date: Jan. 23, 2020

(87) PCT Pub. No.: WO2019/022465
PCT Pub. Date: Jan. 31, 2019

(65) Prior Publication Data
US 2021/0156774 A1    May 27, 2021

(30) Foreign Application Priority Data

Jul. 25, 2017  (KR) .......................... 10-2017-0094362

(51) Int. Cl.
*G01N 3/42*    (2006.01)
*G01N 27/04*   (2006.01)
(Continued)

(52) U.S. Cl.
CPC .............. *G01N 3/066* (2013.01); *G01N 3/08* (2013.01); *G01N 2203/0019* (2013.01);
(Continued)

(58) Field of Classification Search
CPC combination set(s) only.
See application file for complete search history.

(56) References Cited

U.S. PATENT DOCUMENTS 7,305,890 B2 * 12/2007 Zias ...................... G01L 9/0073
                                                              73/780
2015/0192504 A1 * 7/2015 Cho .................. B01L 3/502753
                                                             435/297.1

FOREIGN PATENT DOCUMENTS

JP      2015-155866 A    8/2015
KR   10-2007-0096655 A   10/2007
(Continued)

OTHER PUBLICATIONS

International Search Report (with English Translation) dated Oct. 26, 2018 for International Application No. PCT/KR2018/008340; 4 Pages.

*Primary Examiner* — Brandi N Hopkins
(74) *Attorney, Agent, or Firm* — Daly Crowley Mofford & Durkee, LLP

(57) ABSTRACT

An elasticity measurement apparatus includes a lower layer structure having first and second openings, first and second deformable membranes covering the first and second openings to define first and second chamber and deformable by pressure within the first and second chambers respectively, a support layer structure on the lower layer structure to protrude and configured to support the first and second deformable membranes to be spaced apart from the elastic body, a driving portion to apply pressure within the first and second chambers to deform the first and second deformable membranes, and first and second deformation detecting portions to detect deformations of first and second deformable membranes. When the pressure within the first and second chambers is increased from a first pressure to a second pressure, the first deformable membrane is deformed with contacting the elastic body, while the second deformable membrane is deformed without contacting the elastic body.

21 Claims, 15 Drawing Sheets

(51) Int. Cl.
*G01N 27/22* (2006.01)
*G01N 3/06* (2006.01)
*G01N 3/08* (2006.01)

(52) U.S. Cl.
CPC ............. *G01N 2203/0058* (2013.01); *G01N 2203/0226* (2013.01); *G01N 2203/0232* (2013.01)

(56) References Cited

FOREIGN PATENT DOCUMENTS

| KR | 10-2007-0096656 A | 10/2007 |
| KR | 10-1518265 B1 | 5/2015 |
| KR | 10-2015-0126520 A | 11/2015 |

\* cited by examiner

US 11,385,149 B2

ELASTICITY MEASUREMENT DEVICE

CROSS REFERENCE TO RELATED APPLICATIONS

This application is a U.S. National Stage of PCT/KR2018/008340 filed in the Korean language on Jul. 24, 2018, which application claims the priority benefit of Korean Patent Application No. 10-2017-0094362 filed on Jul. 25, 2017 in the Korean Intellectual Property Office, the disclosure of which is incorporated herein by reference.

TECHNICAL FIELD

The present invention relates to an elasticity measurement apparatus. More particularly, the present invention relates to an elasticity measurement apparatus capable of detecting an elasticity of an elastic body such as human skin.

BACKGROUND ART

In a device for measuring an elasticity of a soft material such as rubber or skin, it may be important to contact the measuring device with a test object with a constant force in order to increase the measurement accuracy and reproducibility. However, a conventional elasticity measuring device has a disadvantage in that measurement accuracy and reproducibility are poor because there is no mechanism for contacting the measuring device with the test object.

DISCLOSURE OF THE INVENTION

Problems to be Solved

An object of the present invention provides an elasticity measurement apparatus capable of measuring an elasticity of a material such as skin or rubber easily and precisely.

Means to Solve the Problems

According to example embodiments, an elasticity measurement apparatus includes a lower layer structure having a first opening and a second opening, first and second deformable membranes covering the first and second openings to define first and second chamber and deformable upwardly and downwardly by pressure within the first and second chambers respectively, a support layer structure on the lower layer structure to protrude so as to make contact with an elastic body and configured to support the first and second deformable membranes such that the first and second deformable membranes are spaced apart from the elastic body, a driving portion configured to apply pressure within the first and second chambers to deform the first and second deformable membranes, and first and second deformation detecting portions configured to detect deformations of first and second deformable membranes. When the pressure within the first and second chambers is increased from a first pressure to a second pressure, the first deformable membrane is deformed with contacting the elastic body, while the second deformable membrane is deformed without contacting the elastic body.

In example embodiments, the first deformable membrane may include a protrusion having a predetermined height from a surface thereof, and when the pressure within the first chamber is increased from the first pressure to the second pressure, the protrusion may be in contact with the elastic body.

In this case, when the pressure in the first and second chambers is increased from the first pressure to the second pressure, the first and second deformable membranes may be deformed by same displacements.

In example embodiments, the first and second openings may have same areas.

In example embodiments, an area of the first opening may be greater than an area of the second opening.

In this case, when the pressure within the first and second chambers is increased from the first pressure to the second pressure, the first deformable membrane may be deformed by a first displacement and the second deformable membrane may be deformed by a second displacement less than the first displacement.

In example embodiments, the first and second openings may be connected to each other through a connection passage.

In example embodiments, the driving portion may include a heater configured to increase temperature within the first and second chambers, a hydraulic supply configured to supply a fluid into the first and second chambers to increase pressure therein, a piezoelectric actuator including a piezoelectric material in the first and second deformable membranes and configured to deform the first and second deformable membranes, or an electromagnetic actuator including a magnetic material or a coil and configured to deform the first and second deformable membranes.

In example embodiments, the first and second deformation detecting portions may include a piezoresistance detector configured to detect a change in resistance of an electrode pattern by the deformations of the first and second deformable membranes or a capacitance detect configured to detect a change in capacitance.

In example embodiments, the support layer structure may include a plurality of the columns which are arranged along circumferences of the first and second deformable membranes.

In example embodiments, the elasticity measurement apparatus may further include a contact sensor arranged on the support layer structure and configured to detect a contact condition with the elastic body.

According to example embodiments, an elasticity measurement apparatus includes a chamber layer structure having a first chamber and a second chamber connected to each other by a connection passage, first and second deformable membranes on a lower layer structure to constitute sidewalls of the first and second chambers and deformable upwardly and downwardly by pressure within the first and second chambers respectively, a driving portion configured to apply pressure within the first and second chambers to deform the first and second deformable membranes, and first and second deformation detecting portions configured to detect deformations of first and second deformable membranes. When the pressure within the first and second chambers is increased from a first pressure to a second pressure, the first deformable membrane may be deformed with contacting an elastic body, while the second deformable membrane may be deformed without contacting the elastic body.

In example embodiments, the first deformable membrane may include a protrusion having a predetermined height from a surface thereof, and when the pressure within the first chamber is increased from the first pressure to the second pressure, the protrusion may be in contact with the elastic body.

In this case, when the pressure in the first and second chambers is increased from the first pressure to the second pressure, the first and second deformable membranes may be deformed by same displacements.

In example embodiments, the first and second deformable membranes may have same areas.

In example embodiments, an area of the first deformable membrane may be greater than an area of the second deformable membrane.

In example embodiments, the driving portion may include a heater configured to increase temperature within the first and second chambers.

In example embodiments, the first and second deformation detecting portions may include a piezoresistance detector configured to detect a change in resistance of an electrode pattern by the deformations of the first and second deformable membranes or a capacitance detect configured to detect a change in capacitance.

In example embodiments, the elasticity measurement apparatus may further comprising a support layer structure on the chamber layer structure to protrude so as to make contact with the elastic body and configured to support the first and second deformable membranes such that the first and second deformable membranes are spaced apart from the elastic body.

In example embodiments, the support layer structure may include a plurality of the columns which are arranged along circumferences of the first and second deformable membranes.

In example embodiments, the elasticity measurement apparatus may further include a contact sensor arranged on the support layer structure and configured to detect temperature or humidity property through contact with the elastic body.

Effects of the Invention

According to example embodiments, in an elasticity measurement apparatus, a first deformable membrane may be deformed with contacting an elastic body and a second deformable membrane may be deformed without contacting the elastic body, and thus, an elasticity of the elastic body may be detected from deformation of the first deformable membrane and an inner pressure within a chamber may be detected from deformation of the second deformable membrane.

Through this, it may be possible to check and adjust whether or not the first deformable membrane is in contact with the elastic body with a constant force, and if it does not contact with a constant force, this may be corrected by using a deformation value specified through the second deformable membrane. Thus, a constant contact load may be applied between the elasticity measurement apparatus and the material. In addition, since a contact pressure between the elastic body and the elasticity measurement apparatus device is measured based on the deformation of the second deformable membrane and is set as a reference value for the elasticity, although only the first deformable membrane contacts the elastic body, there may an advantage that measures the elasticity at the contact point accurately.

Furthermore, by adjusting a height of a support layer structure and pressures within first and second chambers, it may be possible to adjust measurement sensitivity of the elasticity measurement apparatus, and a contact sensor may be further provided in the support layer structure to detect temperature and humidity properties of the elastic body.

However, the effect of the invention may not be limited thereto, and may be expanded without being deviated from the concept and the scope of the present invention.

BEST MODE FOR CARRYING OUT THE INVENTION

Figure 1:
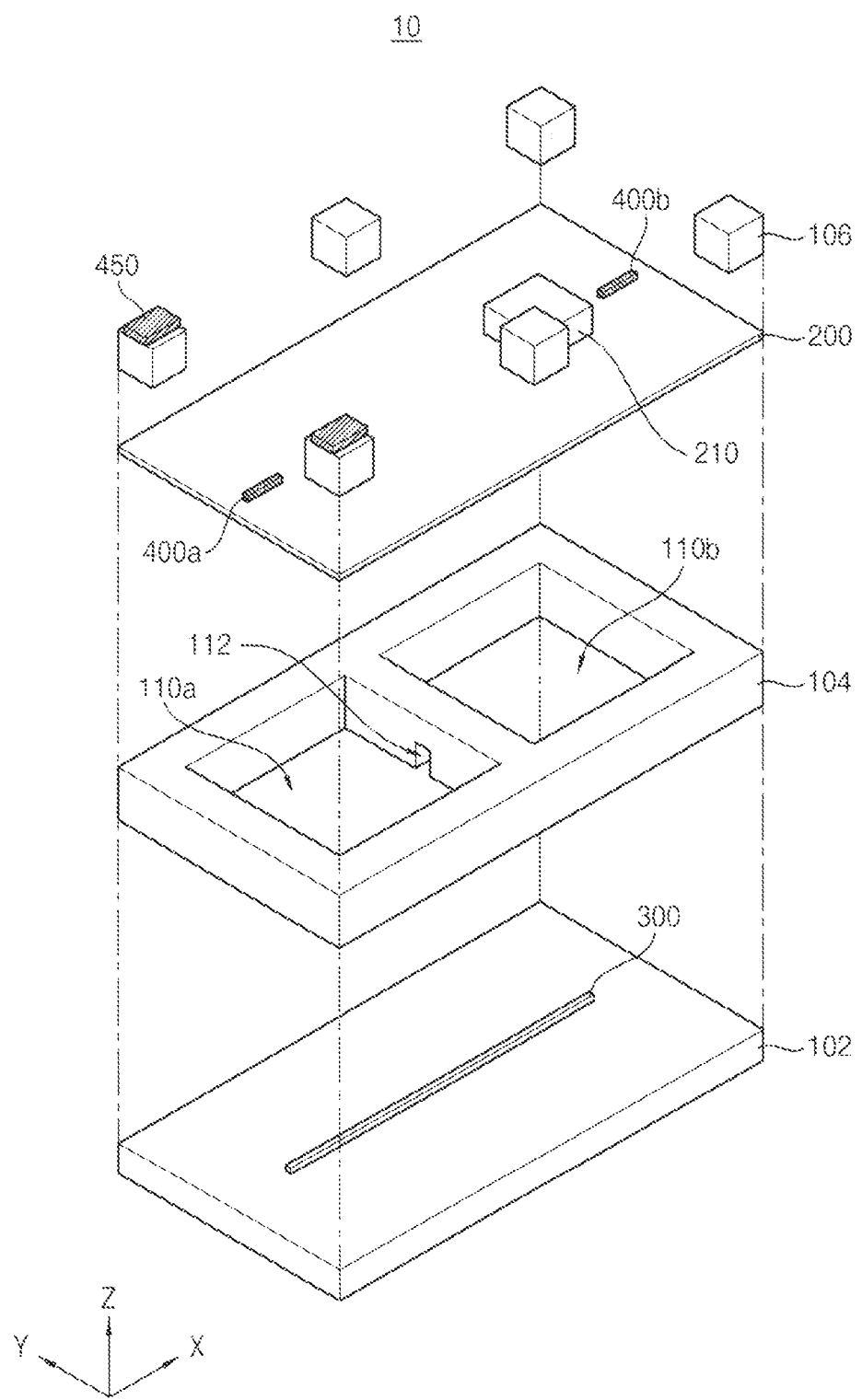
FIG. 1 is a perspective view illustrating an elasticity measurement apparatus in accordance with example embodiments.

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

Figure 2:
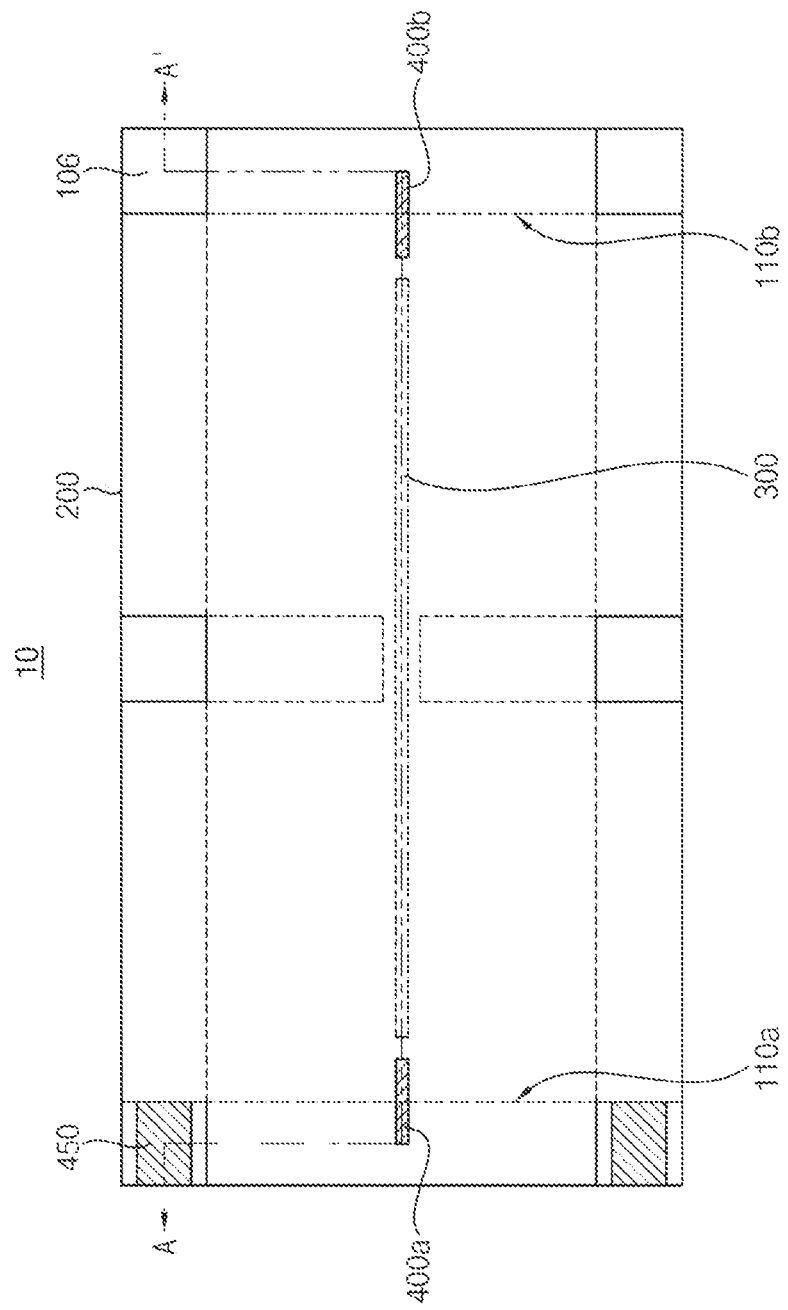
FIG. 2 is a plan view illustrating the elasticity measurement apparatus in FIG. 1.
Figure 3:
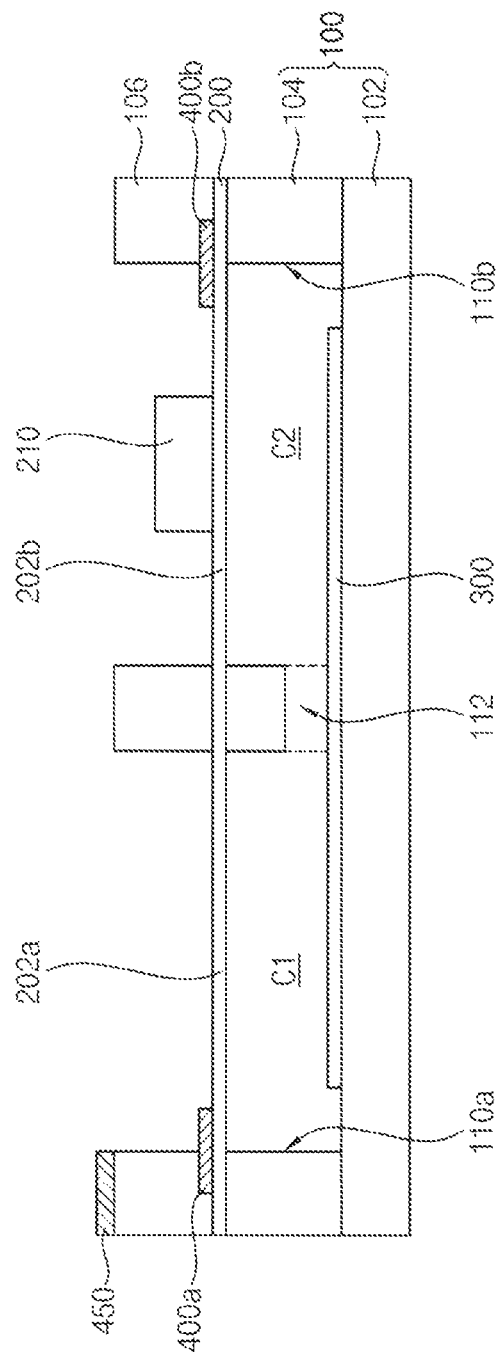
FIG. 3 is a cross-sectional view taken along the line A-A' in FIG. 2.
Figure 4A:
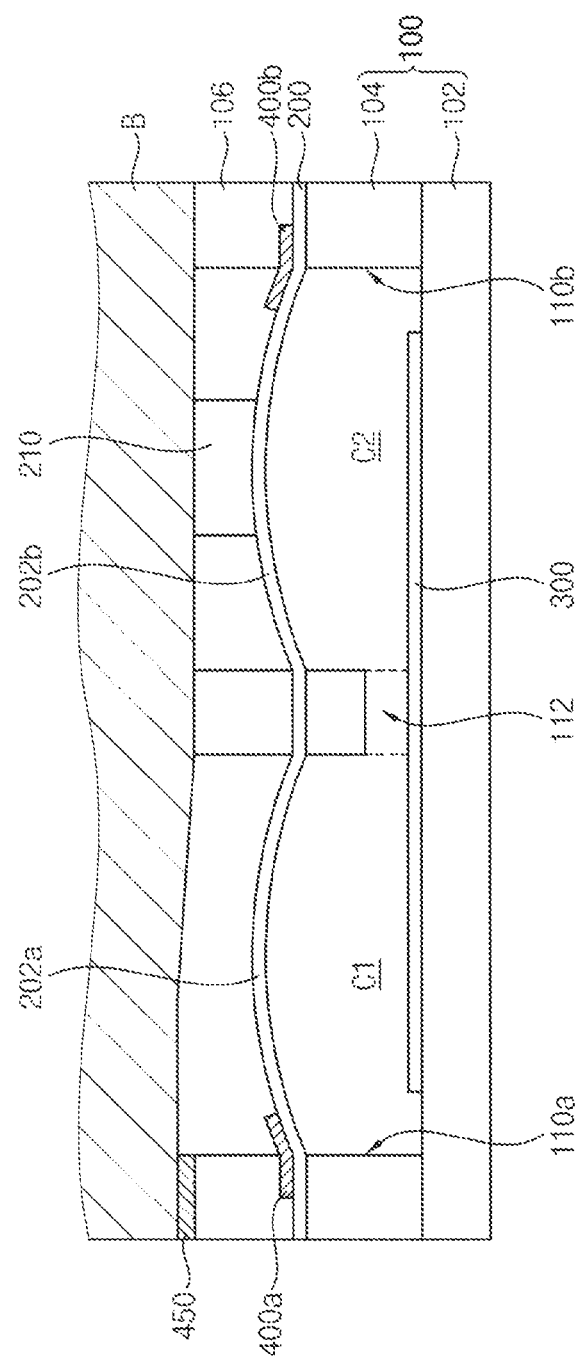
FIGS. 4A and 4B are cross-sectional views illustrating deformations of first and second deformable membranes when elasticity of an elastic body is measured.
Figure 4B:
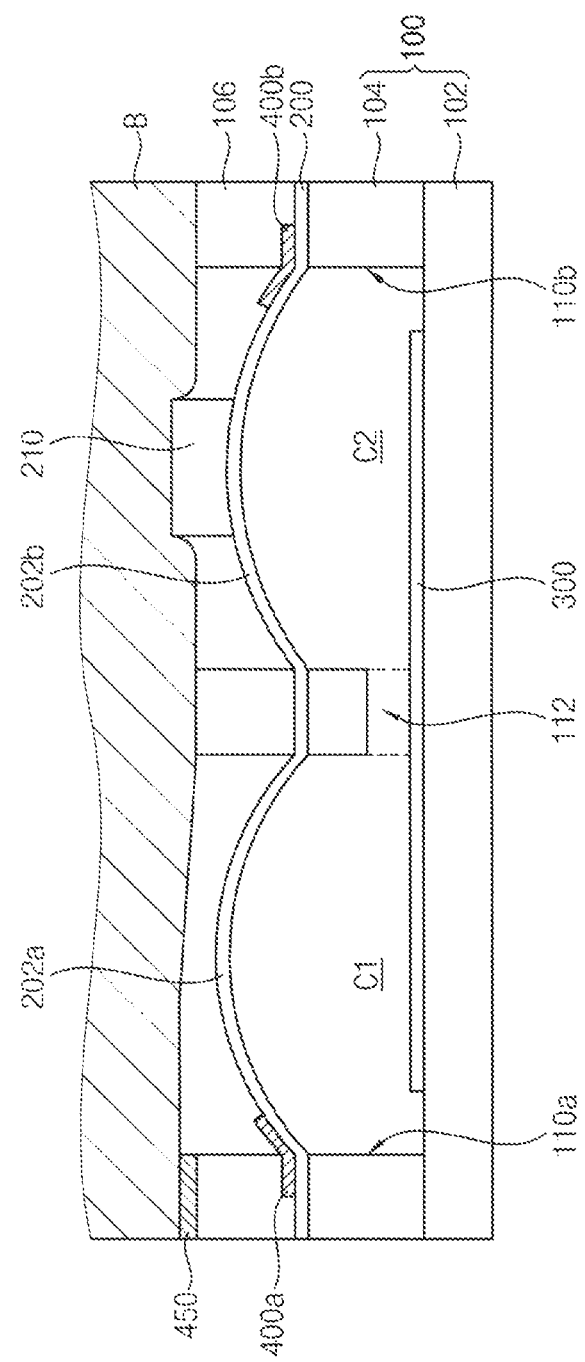

FIG. 1 is a perspective view illustrating an elasticity measurement apparatus in accordance with example embodiments. FIG. 2 is a plan view illustrating the elasticity measurement apparatus in FIG. 1. FIG. 3 is a cross-sectional view taken along the line A-A' in FIG. 2. FIGS. 4A and 4B are cross-sectional views illustrating deformations of first and second deformable membranes when elasticity of an elastic body is measured.

Referring to FIGS. 1 to 4B, an elasticity measurement apparatus 10 may include a lower layer structure 100 having a first opening 110a and a second opening 110b, a deformable membrane 200 on the lower layer structure 100 to cover the first opening 110a and the second opening 110b to define a first chamber C1 and a second chamber C2 respectively, a support layer structure provided on the lower layer structure 100 and having a plurality of columns 106 which protrude to contact an elastic body B, a driving portion configured to apply pressure within the first and second chambers C1, C2, and first and second deformation detecting portions configured to detect deformations of first and second deformable membranes 202a, 202b which constitute sidewalls of the first and second chambers C1, C2 respectively.

For example, the lower layer structure, the deformable membrane and the support layer structure may be formed by semiconductor manufacture processes including growth and etching of a crystal structure using photolithography, ion projection lithography, electron projection lithography and scanning probe growth. For example, the lower layer structure and the support layer structure may be formed using polymer material, inorganic material, etc. The deformable membrane may be formed using polymer material having flexible characteristics. Examples of the polymer material may be PDMS (polydimethylsiloxane), PMMA (polymethylmethacrlyate), SU-8, etc. The examples of the inorganic material may be glass, quartz, silicon, etc.

As illustrated in FIGS. 1 to 3, the elasticity measurement apparatus 10 may include the lower layer structure 100, the deformable membrane 200 and the support layer structure sequentially stacked on another.

The lower layer structure 100 may include a first substrate 102 and a second substrate 104 stacked on the first substrate 102. The lower layer structure 100 may include the first and second openings 110a, 110b spaced apart from each other in a first direction (X direction). The first and second openings 110a, 110b may be connected to each other through a connection passage 112.

For example, the first and second openings 110a, 110b may have same areas. The first and second openings 110a, 110b may have same heights. As viewed in plan view, the first and second openings 110a, 110b may have a square or a rectangle shape, however, it may not be limited thereto, and it may be understood that the first and second openings may have various shapes in consideration of the pressure, the deformation of the deformation membrane, etc.

The deformable membrane 200 may be stacked on the lower layer structure 100 to form a chamber layer structure. The support layer structure may be stacked on the lower layer structure with the deformable membrane 200 interposed therebetween.

As illustrated in FIG. 3, the deformable membrane 200 may cover the first and second openings 110a, 110b to form the first and second chambers C1, C2 respectively. The first and second chambers C1, C2 may have same areas. The first and second chambers C1, C2 may have same volumes. The first and second chambers C1, C2 may be connected to each other by the connection passage 112. Accordingly, the pressure of the first chamber C1 may be the same as the pressure of the second chamber C2.

The deformable membrane 200 may include the first and second deformable membranes 202a, 202b which are provided on the lower layer structure 100 to constitute the sidewalls of the first and second chambers C1, C2 respectively. The first deformable membrane 202a may cover the first opening 110a to define the first chamber C1, and may be deformed upwardly and downwardly by the pressure within the first chamber C1. The second deformable membrane 202b may cover the second opening 110b to define the second chamber C2, and may be elastically deformed upwardly and downwardly by the pressure within the second chamber C2.

When the first and second openings 110a, 110b have same areas, the first and second deformable membranes 202a, 202b may have same areas. Because the first and second chambers C1, C2 are connected to each other by the connection passage 112, the pressure of the first chamber C1 may be the same as the pressure of the second chamber C2. In this case, the first and second deformable membranes 202a, 202b may be deformed by same displacements according to a change in pressure within the first and second chambers C1, C2.

The support layer structure may be arranged on the lower layer structure 100 with the deformable membrane 200 interposed therebetween to support the first and second deformable membranes 202a, 202b such that the first and second deformable membranes 202a, 202b may be spaced apart from the elastic body B.

In particular, the support layer structure may include a plurality of the columns 106 which are arranged on the deformable membrane 200 along circumferences of the first and second deformable membranes 202a, 202b. The columns 106 may have same heights from the lower layer structure. When the first and second deformable membranes 202a, 202b are not deformed, the first and second deformable membranes 202a, 202b may be spaced apart from the elastic body B by the heights of the columns 106. The height of the column 106 may be determined in consideration of the elasticity of the elastic body B to be measured, the degrees of deformations of the first and second deformable membranes 202a, 202b, etc. Additionally, a section of the column 106 may not be limited to a circle shape, for example, may have various shapes such as an oval shape, a polygonal shape, etc.

Although one first chamber C1 and one second chamber C2 are illustrated, it may not be limited thereto, for example, a plurality of the first and chambers C1, C2 may be arranged in an array.

In example embodiments, the driving portion may apply pressure within the first and second chambers C1, C2 to deform the first and second deformable membranes 202a, 202b.

For example, the driving portion may include a heater 300 to increase temperature within the first and second chambers C1, C2. The heater 300 may extend on an upper surface of the first substrate 102 along the first direction (X direction). Accordingly, the driving portion may use increase pressure within the first and second chambers C1, C2 using the heater 300 in a thermo-pneumatic manner to deform the first and second deformable membranes 202a, 202b.

Alternatively, the driving portion may include a hydraulic supply configured to supply a fluid (for example, pneumatic pressure) into the first and second chambers C1, C2 to increase pressure therein, a piezoelectric actuator including a piezoelectric material in the first and second deformable membranes 202a, 202b and configured to deform the first and second deformable membranes 202a, 202b, or an electromagnetic actuator including a magnetic material or a coil and configured to deform the first and second deformable membranes 202a, 202b.

In example embodiments, the first deformation detecting portion may include a first electrode pattern 400a to detect the deformation of the first deformable membrane 202a, and the second deformation detecting portion may include a second electrode pattern 400b to detect the deformation of the second deformable membrane 202b.

The first electrode pattern 400a may be formed to cross a boundary of the first opening 110a, and the second electrode pattern 400b may be formed to cross a boundary of the second opening 110b. The first and second deformation detecting portions may detect resistances of the first and second electrode patterns 400a, 400b to measure the deformations of the first and second deformable membrane 202a, 202b based on changes in the resistances.

As illustrated in FIGS. 4A and 4B, when the pressure within the first and second chambers C1, C2 may be increased from a first pressure P1 to a second pressure P2, the second deformable membrane 202b may be deformed with contacting the elastic body B, while the first deformable membrane 202a may be deformed without contacting the elastic body B.

In example embodiments, the second deformable membrane 202b may further include a protrusion 210 having a predetermined height from a surface of the second deformable membrane 202b.

When the pressure within the first and second chambers C1, C2 is increased from an initial pressure P0 (for example, atmospheric pressure) to the first pressure P1, the first and second deformable membranes 202a, 202b may be deformed by a constant displacement and the protrusion 210 on the second deformable membrane 202b may make contact with the elastic body B.

When the pressure within the first and second chambers C1, C2 is increased from the first pressure P1 to the second pressure P2, the first deformable membrane 202a may be deformed by a first displacement without contacting the elastic body B, while the second deformable membrane 202b may be deformed by a second displacement with contacting the elastic body B. That is, the second deformable membrane 202b may deform the elastic body B by the second displacement.

In this case, the first chamber C1 may be a reference chamber and the second chamber C2 may be a detection chamber, the first deformable membrane 202a may be a reference membrane and the second deformable membrane 202b may be a detection membrane. When the pressure within the first and second chambers C1, C2 is increased from the first pressure P1 to the second pressure P2, the elasticity of the elastic body B may be measured using a difference value between the detected deformations of the first and second deformable membranes 202a, 202b.

In example embodiments, the elasticity measurement apparatus 10 may further include a contact sensor 450 arranged on the support layer structure and configured to detect a contact condition with the elastic body B.

The contact sensor 450 may be arranged on an upper surface of the column 106. The contact sensor 450 may include a sensing device configured to detect the contact condition with the elastic body B using temperature, electrical conductivity, chemical property, etc.

Figure 5:
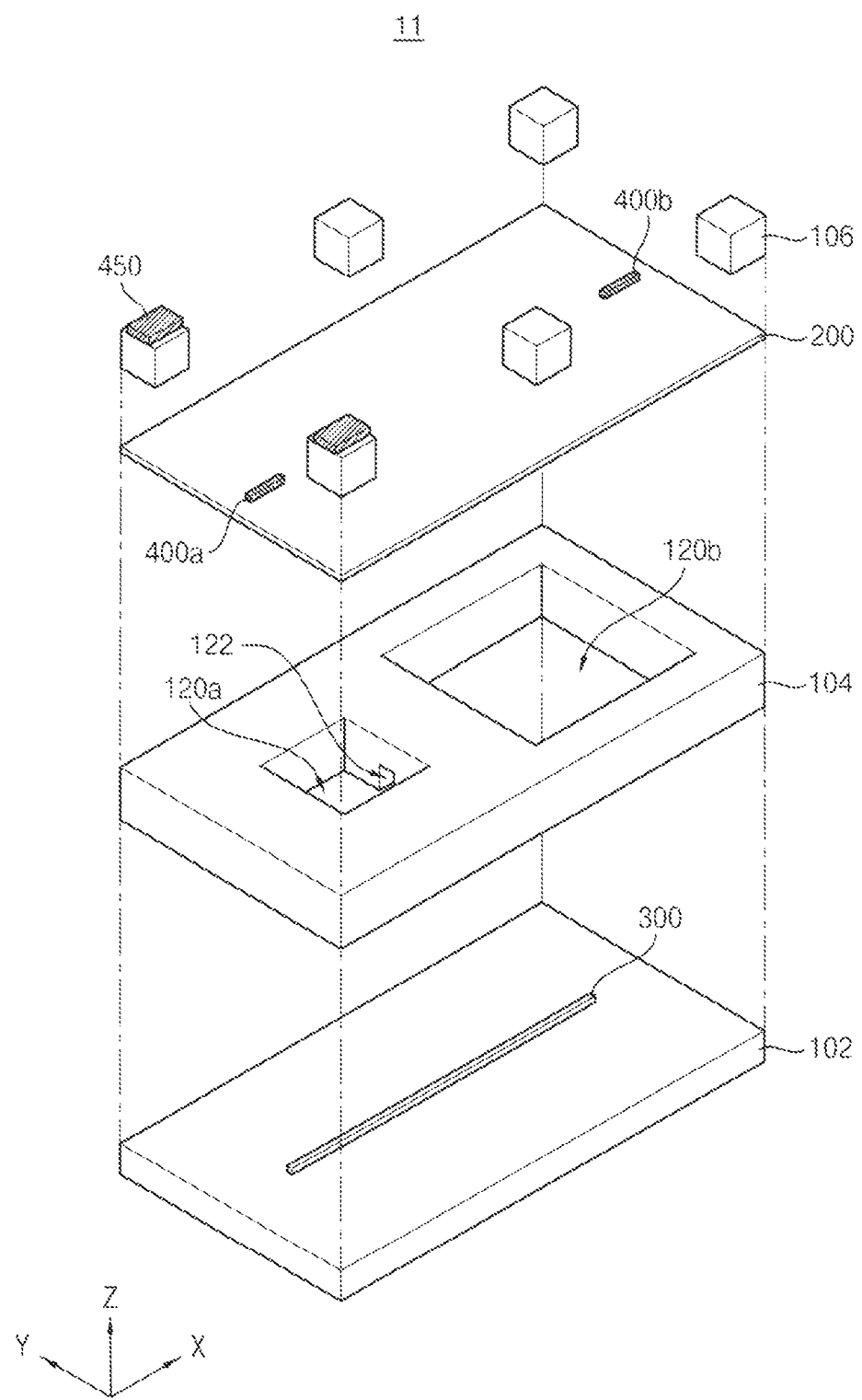
FIG. 5 is a perspective view illustrating an elasticity measurement apparatus in accordance with example embodiments.
Figure 6:
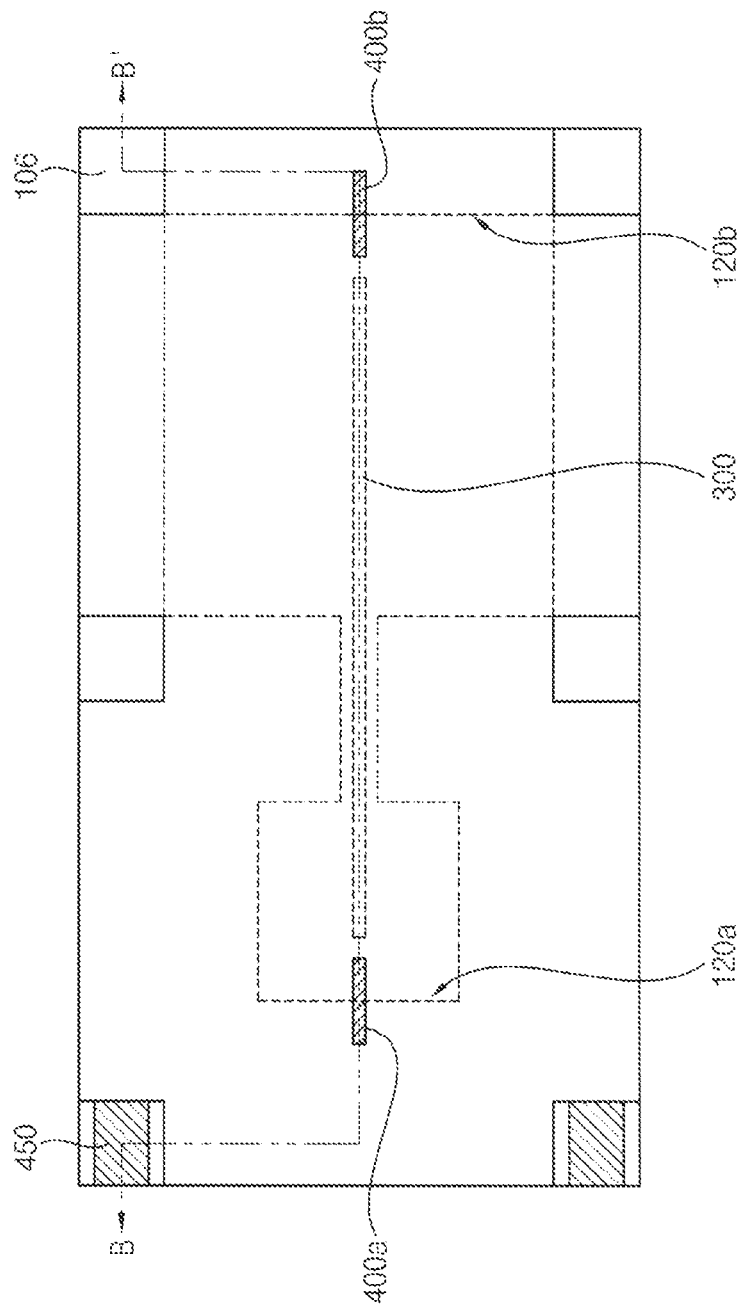
FIG. 6 is a plan view illustrating the elasticity measurement apparatus in FIG. 5.
Figure 7:
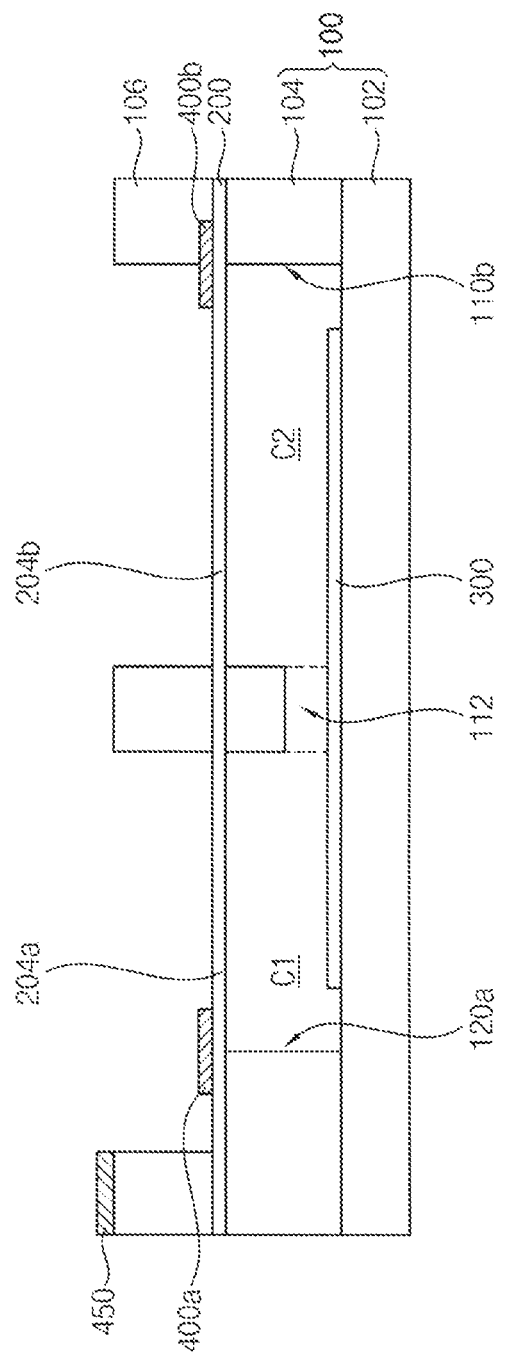
FIG. 7 is a cross-sectional view taken along the line B-B' in FIG. 6.
Figure 8A:
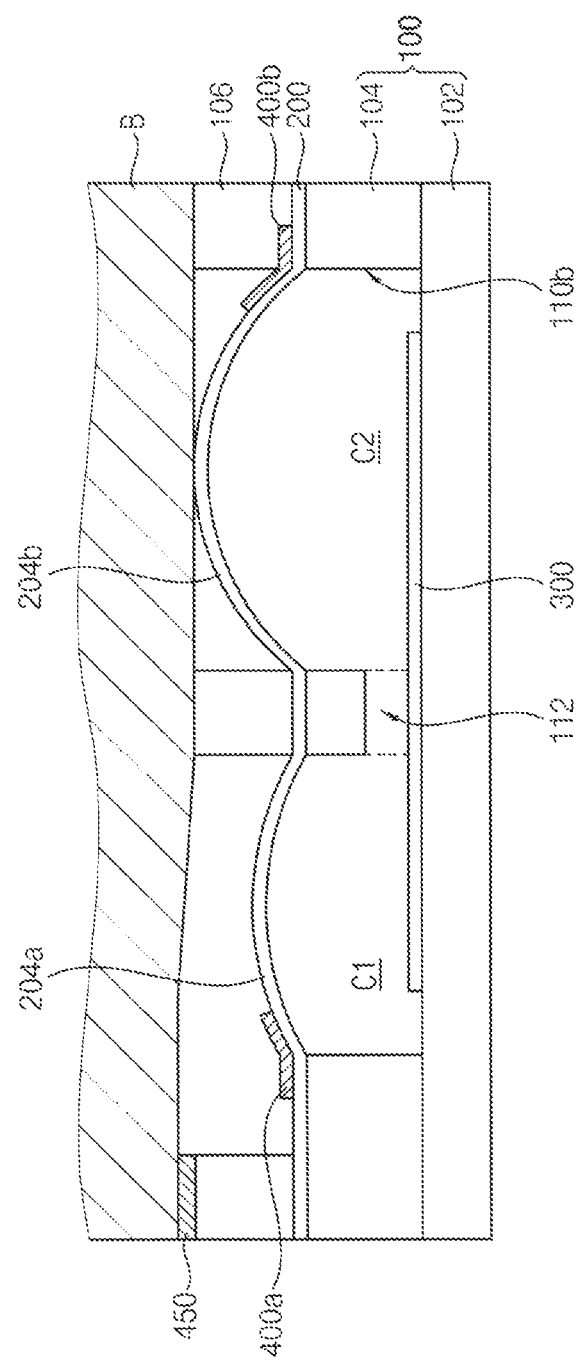
FIGS. 8A and 8B are cross-sectional views illustrating deformations of first and second deformable membranes when elasticity of an elastic body is measured.
Figure 8B:
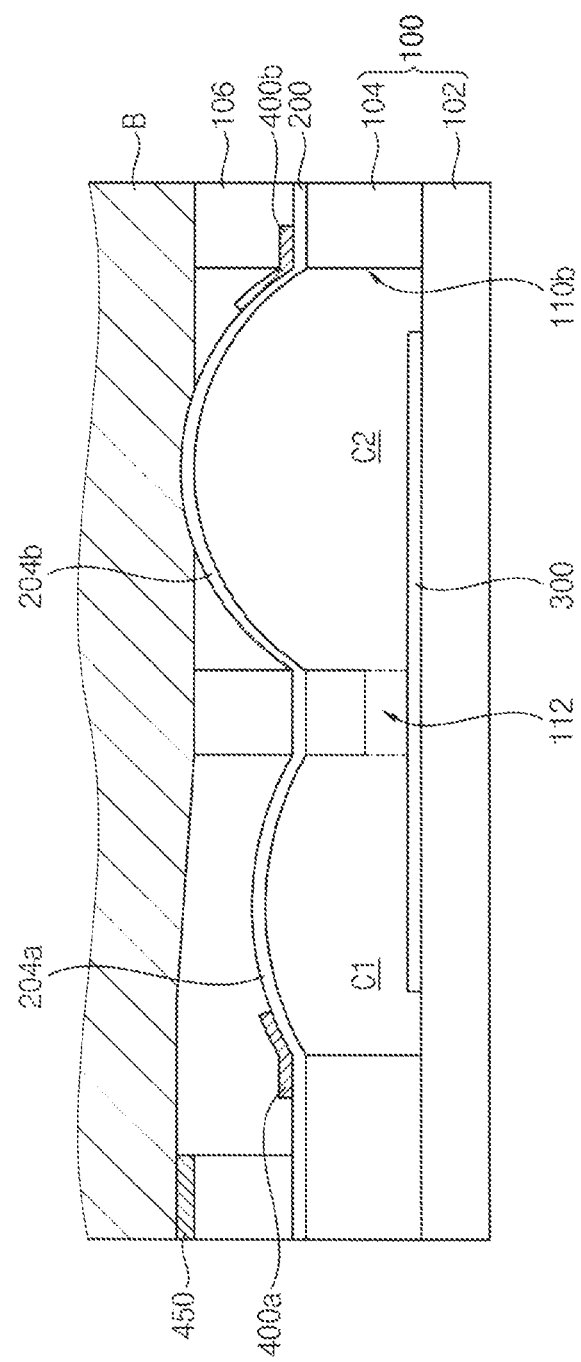

FIG. 5 is a perspective view illustrating an elasticity measurement apparatus in accordance with example embodiments. FIG. 6 is a plan view illustrating the elasticity measurement apparatus in FIG. 5. FIG. 7 is a cross-sectional view taken along the line B-B' in FIG. 6. FIGS. 8A and 8B are cross-sectional views illustrating deformations of first and second deformable membranes when elasticity of an elastic body is measured. The elasticity measurement apparatus may be substantially the same as or similar to the elasticity measurement apparatus described with reference to FIG. 1, except configurations of a reference membrane and a detection membrane. Thus, same reference numerals will be used to refer to the same or like elements and any further repetitive explanation concerning the above elements will be omitted.

Referring to FIGS. 5 to 8B, a lower layer structure 100 of an elasticity measurement apparatus 11 may include first and second openings 120a, 120b spaced apart from each other in a first direction (X direction). The first and second openings 120a, 120b may be connected to each other through a connection passage 122. A deformable membrane 200 may cover the first and second openings 120a, 120b to define a first chamber C1 and a second chamber C2 respectively. The deformable membrane 200 may include first and second deformable membranes 204a, 204b which are provided on the lower layer structure 100 to constitute sidewalls of the first and second chambers C1, C2 respectively.

In example embodiments, the first and second openings 120a, 120b may have different areas. The first and second chambers C1, C2 may have different volumes. The first and second deformable membranes 204a, 204b may have different areas.

For example, the first opening 120a may have a first area, and the second opening 120b may have a second area greater than the first area. Accordingly, the first deformable membrane 204a may have the first area, and the second deformable membrane 204b may have the second area greater than the first area.

The first deformable membrane 204a may be deformed by a first displacement by pressure within the first chamber C1, and the second deformable membrane 204b may be deformed by a second displacement greater than the first displacement by pressure within the second chamber C2.

As illustrated in FIGS. 8A and 8B, when the pressure within the first and second chambers C1, C2 may be increased from a first pressure P1 to a second pressure P2, the second deformable membrane 204b may be deformed with contacting the elastic body B, while the first deformable membrane 204a may be deformed without contacting the elastic body B.

When the pressure within the first and second chambers C1, C2 is increased from an initial pressure P0 (for example, atmospheric pressure) to the first pressure P1, the first deformable membrane 204a may be deformed by a constant displacement and the second deformable membrane 204b may deformed by a displacement greater than the first deformable membrane 204a.

When the pressure within the first and second chambers C1, C2 is increased from the first pressure P1 to the second pressure P2, the first deformable membrane 204a may be deformed by a first displacement without contacting the elastic body B, while the second deformable membrane 204b may be deformed by a second displacement with contacting the elastic body B. That is, the second deformable membrane 204b may deform the elastic body B by the second displacement.

In this case, the first chamber C1 may be a reference chamber, and the second chamber C2 may be a detection chamber. When the pressure within the first and second chambers C1, C2 is increased from the first pressure P1 to the second pressure P2, the elasticity of the elastic body B may be measured using a difference value between the detected deformations of the first and second deformable membranes 204a, 204b.

Figure 9:
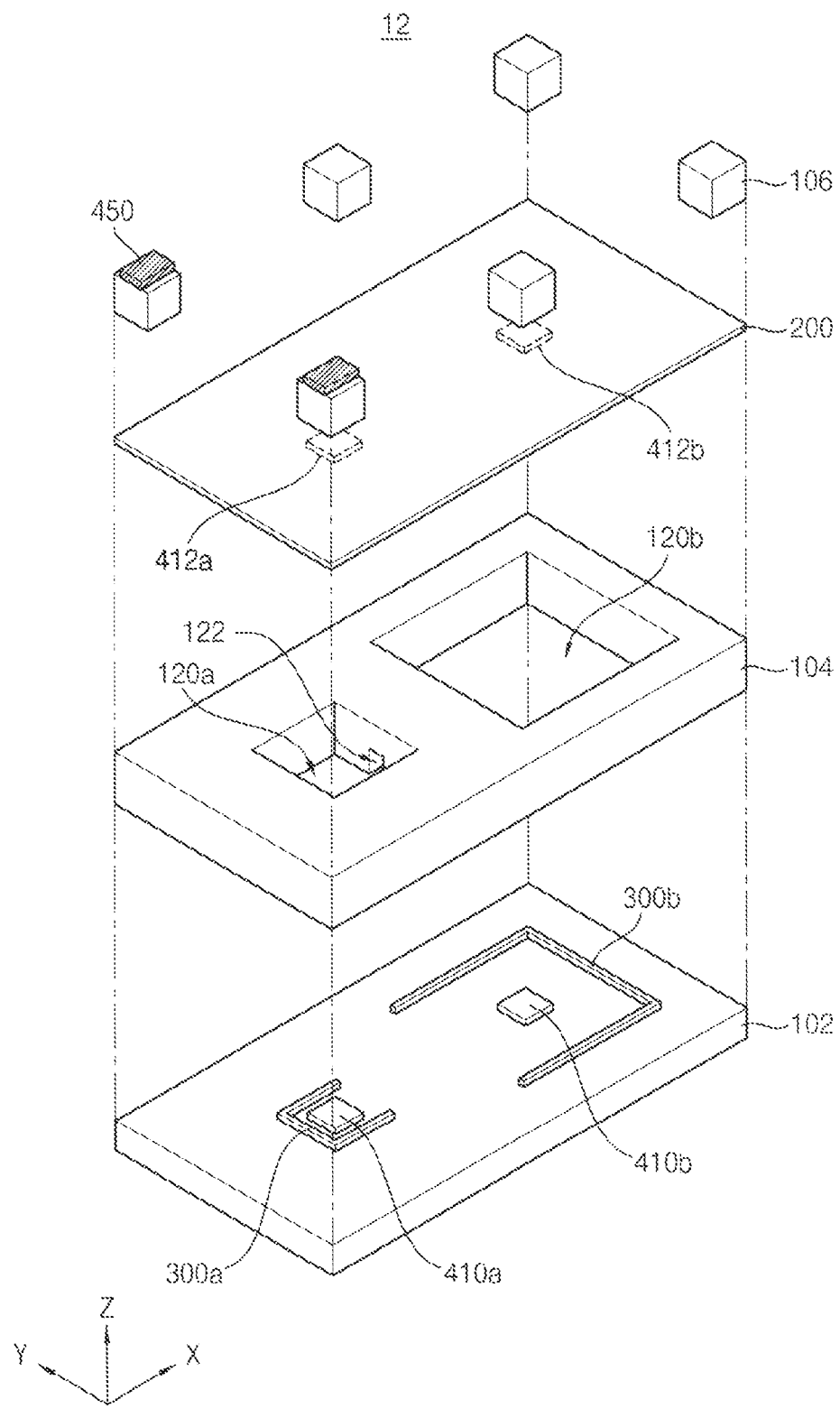
FIG. 9 is a perspective view illustrating an elasticity measurement apparatus in accordance with example embodiments.
Figure 10:
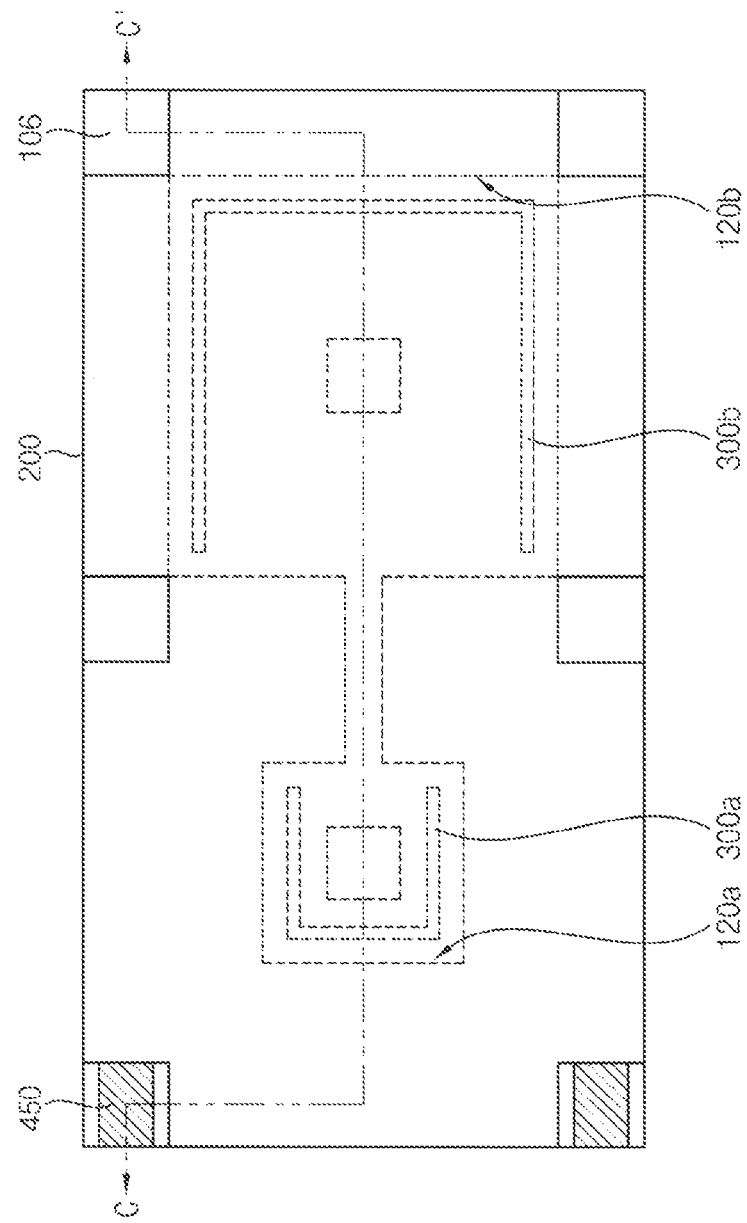
FIG. 10 is a plan view illustrating the elasticity measurement apparatus in FIG. 9.
Figure 11:
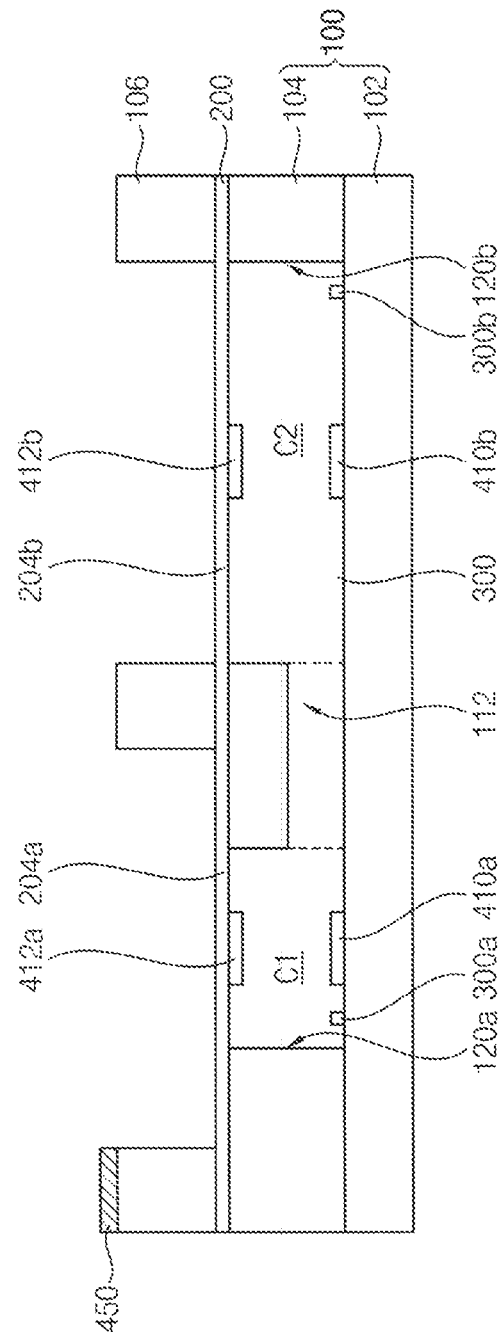
FIG. 11 is a cross-sectional view taken along the line C-C' in FIG. 10.
Figure 12A:
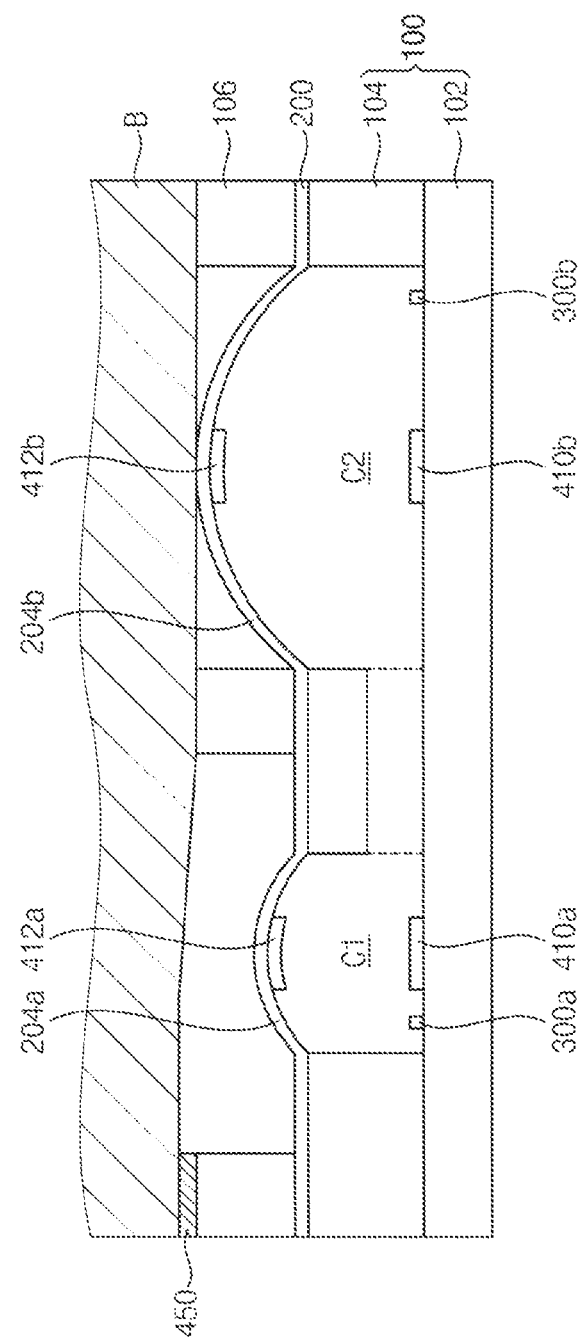
FIGS. 12A and 12B are cross-sectional views illustrating deformations of first and second deformable membranes when elasticity of an elastic body is measured.
Figure 12B:
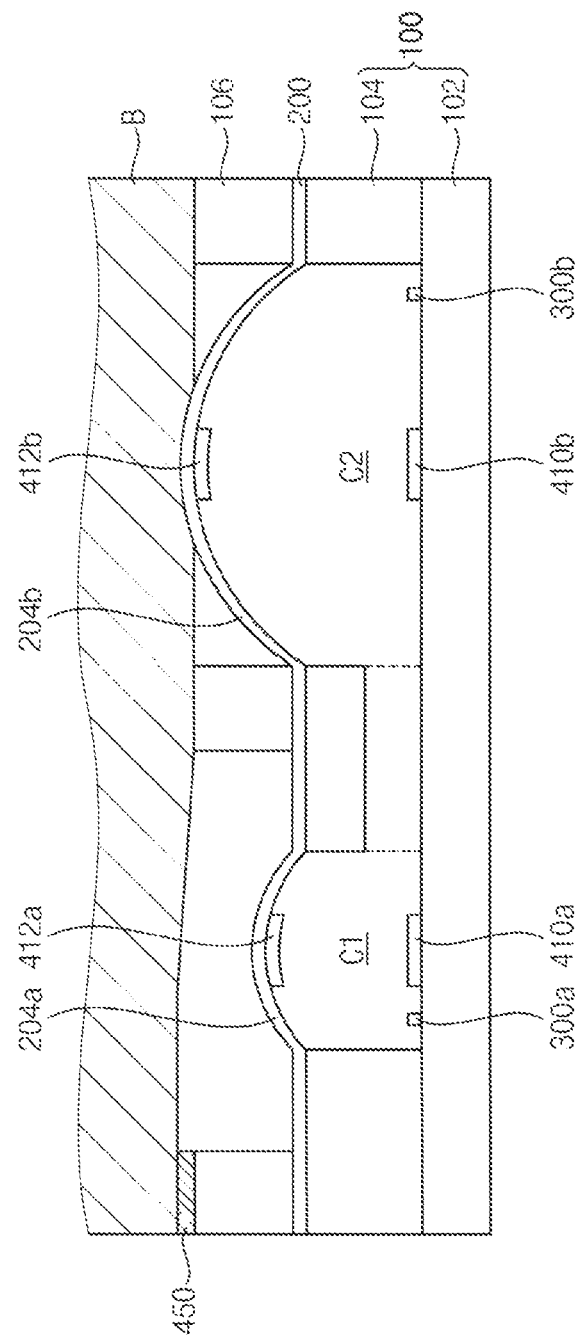

FIG. 9 is a perspective view illustrating an elasticity measurement apparatus in accordance with example embodiments. FIG. 10 is a plan view illustrating the elasticity measurement apparatus in FIG. 9. FIG. 11 is a cross-sectional view taken along the line C-C' in FIG. 10. FIGS. 12A and 12B are cross-sectional views illustrating deformations of first and second deformable membranes when elasticity of an elastic body is measured. The elasticity measurement apparatus may be substantially the same as or similar to the elasticity measurement apparatus described with reference to FIG. 1, except first and second deformation detection portions. Thus, same reference numerals will be used to refer to the same or like elements and any further repetitive explanation concerning the above elements will be omitted.

Referring to FIGS. 9 to 12B, a lower layer structure 100 of an elasticity measurement apparatus 12 may include first and second openings 120a, 120b spaced apart from each other in a first direction (X direction). A deformable membrane 200 may cover the first and second openings 120a, 120b to define a first chamber C1 and a second chamber C2 respectively. The deformable membrane 200 may include first and second deformable membranes 204a, 204b which are provided on the lower layer structure 100 to constitute sidewalls of the first and second chambers C1, C2 respectively.

In example embodiments, the first and second openings 120a, 120b may have different areas. The first and second chambers C1, C2 may have different volumes. The first and second deformable membranes 204a, 204b may have different areas.

For example, the first opening 120a may have a first area, and the second opening 120b may have a second area greater than the first area. Accordingly, the first deformable membrane 204a may have the first area, and the second deformable membrane 204b may have the second area greater than the first area.

The first deformable membrane 204a may be deformed by a first displacement by pressure within the first chamber C1, and the second deformable membrane 204b may be deformed by a second displacement greater than the first displacement by pressure within the second chamber C2.

In example embodiments, the first deformation detecting portion may include a first capacitance detector to detect the deformation of the first deformable membrane 204a, and the second deformation detecting portion may include a second capacitance detector to detect the deformation of the second deformable membrane 204b.

The first capacitance detector may include a pair of first electrodes facing each other. The first electrode pair may include a first lower electrode pattern 410a and a first upper electrode pattern 412a respectively arranged on a lower surface and an upper surface of the first chamber C1 to face each other. The second electrode pair may include a second lower electrode pattern 410b and a second upper electrode pattern 412b respectively arranged on a lower surface and an upper surface of the second chamber C2 to face each other.

Additionally, the driving portion may include a first heater 300a to increase temperature within the first chamber C1 and a second heater 300b to increase temperature within the second chamber C2. The first heater 300a may extend on a lower surface of the first chamber C1, and the second heater 300b may extend on a lower surface of the second chamber C2. Accordingly, the driving portion may use increase pressure within the first and second chambers C1, C2 using the first and second heaters 300a, 300b in a thermo-pneumatic manner to deform the first and second deformable membranes 204a, 204b.

The present invention has been explained with reference to preferable embodiments, however, those skilled in the art may understand that the present invention may be modified or changed without being deviated from the concept and the scope of the present invention disclosed in the following claims.

| <The description of the reference numerals> | |
|---|---|
| 10, 11, 12: elasticity measurement apparatus | 100: lower layer structure |
| 102: first substrate | 104: second substrate |
| 106: column | 110a, 120a: first opening |
| 110b, 120b: second opening | 112, 122: connection passage |
| 200: deformable membrane | 202a, 202b: first deformable membrane |
| 202b, 204b: second deformable membrane | 210: protrusion |
| 300: heater | 300a: first heater |
| 300b: second heater | 400a: first electrode pattern |
| 400b: second electrode pattern | 410a: first lower electrode pattern |
| 412a: first upper electrode pattern | 410b: second lower electrode pattern |
| 412a: second upper electrode pattern | 450: contact sensor |

The invention claimed is:

1. An elasticity measurement apparatus, comprising:
a lower layer structure having a first opening and a second opening;
first and second deformable membranes covering the first and second openings to define first and second chamber and deformable upwardly and downwardly by pressure within the first and second chambers respectively;

a support layer structure on the lower layer structure to protrude so as to make contact with an elastic body and configured to support the first and second deformable membranes such that the first and second deformable membranes are spaced apart from the elastic body;

a driving portion configured to apply pressure within the first and second chambers to deform the first and second deformable membranes; and first and second deformation detecting portions configured to detect deformations of first and second deformable membranes, wherein when the pressure within the first and second chambers is increased from a first pressure to a second pressure, the first deformable membrane is deformed with contacting the elastic body, while the second deformable membrane is deformed without contacting the elastic body.

2. The elasticity measurement apparatus of claim 1, wherein the first deformable membrane comprises a protrusion having a predetermined height from a surface thereof, and wherein when the pressure within the first chamber is increased from the first pressure to the second pressure, the protrusion is in contact with the elastic body.

3. The elasticity measurement apparatus of claim 2, wherein when the pressure in the first and second chambers is increased from the first pressure to the second pressure, the first and second deformable membranes are deformed by same displacements.

4. The elasticity measurement apparatus of claim 2, wherein the first and second openings have same areas.

5. The elasticity measurement apparatus of claim 1, wherein an area of the first opening is greater than an area of the second opening.

6. The elasticity measurement apparatus of claim 5, wherein when the pressure within the first and second chambers is increased from the first pressure to the second pressure, the first deformable membrane is deformed by a first displacement and the second deformable membrane is deformed by a second displacement less than the first displacement.

7. The elasticity measurement apparatus of claim 1, wherein the first and second openings are connected to each other through a connection passage.

8. The elasticity measurement apparatus of claim 1, wherein the driving portion comprises a heater configured to increase temperature within the first and second chambers, a hydraulic supply configured to supply a fluid into the first and second chambers to increase pressure therein, a piezoelectric actuator including a piezoelectric material in the first and second deformable membranes and configured to deform the first and second deformable membranes, or an electromagnetic actuator including a magnetic material or a coil and configured to deform the first and second deformable membranes.

9. The elasticity measurement apparatus of claim 1, wherein the first and second deformation detecting portions comprises a piezoresistance detector configured to detect a change in resistance of an electrode pattern by the deformations of the first and second deformable membranes or a capacitance detect configured to detect a change in capacitance.

10. The elasticity measurement apparatus of claim 1, wherein the support layer structure comprises a plurality of the columns which are arranged along circumferences of the first and second deformable membranes.

11. The elasticity measurement apparatus of claim 1, further comprising a contact sensor arranged on the support layer structure and configured to detect a contact condition with the elastic body.

12. An elasticity measurement apparatus, comprising:

a chamber layer structure having a first chamber and a second chamber connected to each other by a connection passage;

first and second deformable membranes on a lower layer structure to constitute sidewalls of the first and second chambers and deformable upwardly and downwardly by pressure within the first and second chambers respectively;

a driving portion configured to apply pressure within the first and second chambers to deform the first and second deformable membranes; and first and second deformation detecting portions configured to detect deformations of first and second deformable membranes, wherein when the pressure within the first and second chambers is increased from a first pressure to a second pressure, the first deformable membrane is deformed with contacting an elastic body, while the second deformable membrane is deformed without contacting the elastic body.

13. The elasticity measurement apparatus of claim 12, wherein the first deformable membrane comprises a protrusion having a predetermined height from a surface thereof, and wherein when the pressure within the first chamber is increased from the first pressure to the second pressure, the protrusion is in contact with the elastic body.

14. The elasticity measurement apparatus of claim 13, wherein when the pressure in the first and second chambers is increased from the first pressure to the second pressure, the first and second deformable membranes are deformed by same displacements.

15. The elasticity measurement apparatus of claim 13, wherein the first and second deformable membranes have same areas.

16. The elasticity measurement apparatus of claim 12, wherein an area of the first deformable membrane is greater than an area of the second deformable membrane.

17. The elasticity measurement apparatus of claim 12, wherein the driving portion comprises a heater configured to increase temperature within the first and second chambers.

18. The elasticity measurement apparatus of claim 12, wherein the first and second deformation detecting portions comprises a piezoresistance detector configured to detect a change in resistance of an electrode pattern by the deformations of the first and second deformable membranes or a capacitance detect configured to detect a change in capacitance.

19. The elasticity measurement apparatus of claim 12, further comprising a support layer structure on the chamber layer structure to protrude so as to make contact with the elastic body and configured to support the first and second deformable membranes such that the first and second deformable membranes are spaced apart from the elastic body.

20. The elasticity measurement apparatus of claim 19, wherein the support layer structure comprises a plurality of the columns which are arranged along circumferences of the first and second deformable membranes.

21. The elasticity measurement apparatus of claim 19, further comprising a contact sensor arranged on the support layer structure and configured to detect temperature or humidity property through contact with the elastic body.

\* \* \* \* \*